United States Patent
Li (10) Patent No.: US 10,031,685 B2
(45) Date of Patent: Jul. 24, 2018

(54) POWER MANAGEMENT OF STORAGE SUBSYSTEM

(71) Applicant: Quanta Computer Inc., Taoyuan (TW)

(72) Inventor: Yung-Fu Li, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 14/712,615

(22) Filed: May 14, 2015

(65) Prior Publication Data

US 2016/0335019 A1    Nov. 17, 2016

(51) Int. Cl.
G06F 3/06    (2006.01)

(52) U.S. Cl.
CPC .......... *G06F 3/0625* (2013.01); *G06F 3/0634* (2013.01); *G06F 3/0689* (2013.01); *Y02D 10/154* (2018.01)

(58) Field of Classification Search
CPC ..... G06F 3/0625; G06F 3/0659; G06F 3/0683
See application file for complete search history.

(56) References Cited

U.S. PATENT DOCUMENTS

| | | | |
|---|---|---|---|
| 2004/0111596 A1* | 6/2004 | Rawson, III | G06F 1/3203 713/1 |
| 2008/0104204 A1* | 5/2008 | Moore | G06F 3/0608 709/219 |
| 2010/0246058 A1* | 9/2010 | Yamamoto | G06F 1/206 360/97.12 |
| 2015/0120971 A1* | 4/2015 | Bae | G06F 3/0626 710/106 |
| 2016/0210072 A1* | 7/2016 | Aizawa | G06F 3/0625 |

FOREIGN PATENT DOCUMENTS

TW    201039118 A1    11/2010

* cited by examiner

*Primary Examiner* — Edward J Dudek, Jr.
(74) *Attorney, Agent, or Firm* — Nixon Peabody LLP; Eduardo J. Quiñones; Zhou Lu (57) ABSTRACT

Various embodiments of the present technology provide methods for monitoring storage needs of one or more server systems, determining a specific server system that does not need storage capacity from corresponding storage subsystems, determining one or more storage subsystems corresponding to the specific server system, and causing at least one component of the one or more storage subsystems to be switched into a power saving mode.

18 Claims, 6 Drawing Sheets

FIG. 4B

POWER MANAGEMENT OF STORAGE SUBSYSTEM

TECHNICAL FIELD

The present technology relates generally to server systems in a telecommunications network.

BACKGROUND

Modern server farms or datacenters typically employ a large number of servers to handle processing needs for a variety of application services. Each server handles various operations and requires a certain level of storage capacity to handle these operations. For server systems, it is relatively easy to add storage capacity in Just a Bunch of Disks (JBOD) systems. The JBOD system can be a collection of disk drives contained in a single drive enclosure.

However, disks and associated cooling components of JBOD systems consume a lot of electrical energy during a normal operation. The cost of operating JBOD systems can be a significant part of expenditure for a datacenter. Further, all storage devices in a JBOD system are powered by a power supply that is separated from corresponding server systems. Thus, there is a need to control or manage power consumption of the JBOD systems.

SUMMARY

Systems and methods in accordance with various embodiments of the present technology provide a solution to the above-mentioned problems by managing power consumption of one or more storage subsystems (e.g., JBOD systems or storage servers) based at least upon operation statuses of their corresponding server systems. More specifically, various embodiments of the present technology provide methods for monitoring storage needs of one or more server systems, determining a specific server system that does not need storage capacity from corresponding storage subsystems, determining one or more storage subsystems corresponding to the specific server system, and causing at least one component of the one or more storage subsystems to be switched into a power saving mode.

In some embodiments, a storage subsystem can include a plurality of storage device arrays. Each of the plurality of storage device arrays can operate independently from other storage device arrays. In response to determining a specific server system no longer required storage capacity from the storage subsystem, some implementations determine one or more storage device arrays corresponding to the specific server system and cause the one or more storage device arrays to be switched into a power saving mode to save power and extend life time of the corresponding storage device arrays.

In some embodiments, a controller of a server system can be configured to monitor the server system's storage need from one or more storage subsystems. In response to determining the server system no longer needs storage capacity from the one or more storage subsystems, the controller can cause one or more storage device arrays of the one or more storage subsystems that are used by the server system to be switched into a power saving mode. In some implementations, after a predetermined period of time, the controller of the server system makes a second determination whether the server system needs storage capacity from the one or more storage subsystems. In response to the second determination being consistent with an earlier determination, the controller of the server system sends a command to cause the one or more storage device arrays that are used by the server system to be switched to the power saving mode. In some embodiments, switching a storage subsystem into a power saving mode can include at least one of reducing power of or turning off cooling components of the corresponding storage subsystem, reducing operation speed of at least one storage device disk, turning off all storage devices, switching at least one expander of the storage subsystem to an idle or standby mode, or powering off the corresponding storage subsystem.

In some embodiments, an operating system (OS) of a server system can determine whether to call additional storage capacity from one or more storage subsystems. The OS or a controller of the server system can check statuses of storage devices in the one or more storage subsystems and determine whether to send a command to cause at least one storage device of the one or more storage subsystems to be switched into a power saving mode.

In some embodiments, a storage subsystem or a controller of the storage subsystem can monitor storage need from one or more corresponding server systems, determine one or more storage device arrays corresponding to each of one or more the server systems, and determine whether or not to switch the one or more storage device arrays to a power saving mode. In response to determining that a specific server system no longer needs storage capacity from the storage subsystem, the expander or the controller of the storage subsystem can cause at least one storage device of the storage subsystem to be switched to a power saving mode.

In some embodiments, a server system can be powered off by a shutdown signal that was generated remotely. For example, a server system can be powered off by a remote intelligent platform management interface (IPMI) command. Upon receiving the shutdown signal, a controller of the server system can inform a storage subsystem module of the server system to send a command to an expander of a corresponding storage subsystem to cause the storage subsystem to be switched into a power saving mode. The expander can be configured to receive a command from a corresponding server system and manage operations of the storage subsystem or one or more corresponding storage device arrays. For example, the operations of the storage subsystem may include a normal operation mode and a power saving mode. In some embodiments, upon receiving a shutdown signal, a controller of a server system can directly send a command to an expander of a corresponding storage subsystem to cause the storage subsystem to be switched into a power saving mode.

In some embodiments, a storage subsystem module of a server system can be a driver or an application program running on an operating system (OS) of the server system. The storage subsystem module of the server system can be configured to monitor the OS of the server system, determine the OS being powered off, and send a command to an expander of a storage subsystem to switch corresponding storage device arrays of the storage subsystem into a power saving mode.

In some embodiments, a server system can be shut down manually. For example, a server system can be manually shut down by pressing a power button of the server system. Upon detecting the power button being pressed, a controller of the server system can inform a storage subsystem module of the server system before powers off the server system. The storage subsystem module of the server system can send a command to an expander of a corresponding storage subsystem to cause the storage subsystem or one or more corresponding storage device arrays of the storage subsystem to be switched into a power saving mode. In some implementations, upon detecting the power button being pressed, a controller of the server system can directly send a command to the expander of the corresponding storage subsystem to cause the storage subsystem or corresponding storage device arrays of the storage subsystem to be switched into a power saving mode.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION

Various embodiments of the present technology provide systems and methods for managing power consumption of one or more storage subsystems. In some embodiments, storage needs of one or more server systems can be monitored and used to determine whether one of the server systems no longer needs storage capacity from the one or more storage subsystems. In response to determining that a specific server system does not need storage capacity from the one or more storage subsystems, some embodiments determine at least one storage device of the one or more storage subsystems that corresponds to the specific server system and cause the at least one storage device to be switched to a power saving mode.

Figure 1A:
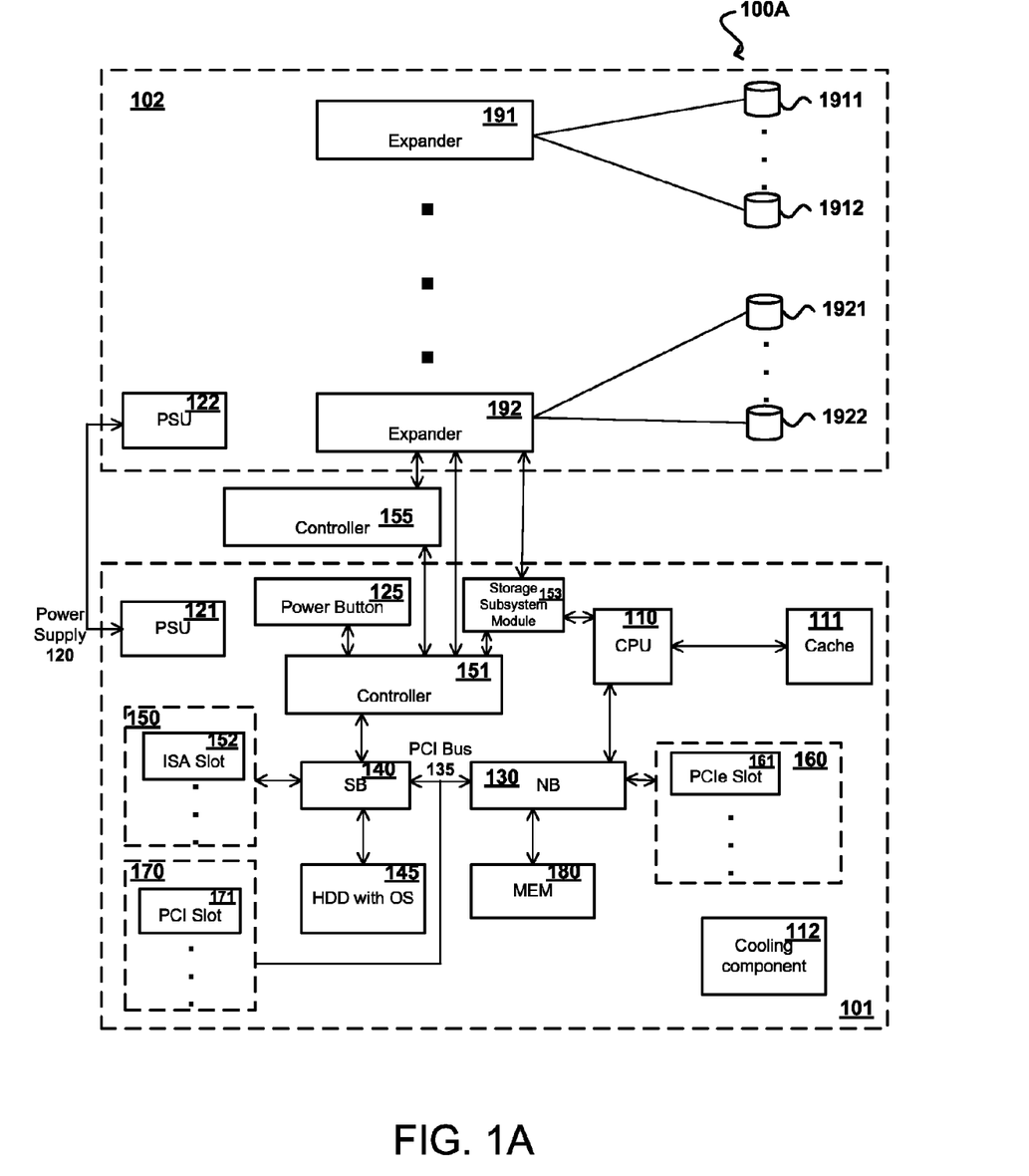
FIGS. 1A and 1B illustrate schematic block diagrams of an exemplary system containing a storage subsystem and a server system in accordance with an implementation of the present technology.

FIG. 1A illustrates a schematic block diagram of an exemplary system 100A containing a storage subsystem 102 and a server system 101 in accordance with an implementation of the present technology. In this example, the server system 101 comprises at least one microprocessor or CPU 110 connected to a cache 111, one or more cooling components 112, a main memory (MEM) 180, at least one power supply unit (PSU) 121 that receives an AC power from a power supply 120 and provides power to the server system 101. The storage subsystem 102 comprises one or more PSUs 122 that receive an AC power from the power supply 120 and provides power to the storage subsystem 102, at least one expander (e.g., expanders 191 and 192), and a plurality of storage devices (e.g., 1911, 1912, 1921 and 1922). The storage devices may include at least one of SCSI (SAS) disk, a serial ATA (SATA) disk, or a solid state drive (SSD). The storage devices may be individual storage devices or may be arranged in a RAID (Redundant Array of Independent Disks). Each of the at least one expander is configured to manage one or more storage devices of the storage subsystem 102 (e.g., receiving commands and routing them to the corresponding storage devices) and communicate with a management module and/or other expanders of the storage subsystem 102. The commands may include read or write commands, information requests, or management commends. The command can be in a format of small computer system interface (SCSI), AT attachment (ATA), or serial ATA (SATA). In this example, the expander 191 is configured to manage the storage devices 1911 and 1912, while the expander 192 is configured to manage the storage devices 1921 and 1922. In some embodiments, the expanders of the storage subsystem 102 are connected to the storage devices in the storage subsystem 102 with connection redundancy to protect against a failed communication link (e.g., a failed cable or port, or accidentally unplugged connection). In some embodiments, the storage subsystem 102 and the server system 101 can be configured on a single rack or different server racks.

The at least one PSU 121 is configured to supply power to various components of the server system 101, such as the CPU 110, cache 111, NB logic 130, PCIe slots 160, Memory 180, SB logic 140, storage device 145, ISA slots 150, PCI slots 170, and controller 151. After being powered on, the server system 101 is configured to load software application from memory, computer storage device, or an external storage device to perform various operations. The hard drive 145 is structured into logical blocks that are available to an operating system and applications of the server system 101 and configured to retain server data even when the server system 101 is powered off. The one or more PSUs 122 are configured to supply powers to various component of the storage subsystem 102, such as the plurality of storage devices, the at least one expander, and one or more cooling components (not shown).

The main memory 180 can be coupled to the CPU 110 via a north bridge (NB) logic 130. A memory control module (not shown) can be used to control operations of the memory 180 by asserting necessary control signals during memory operations. The main memory 180 may include, but is not limited to, dynamic random access memory (DRAM), double data rate DRAM (DDR DRAM), static RAM (SRAM), or other types of suitable memory.

In some implementations, the CPU 110 can be multi-core processors, each of which is coupled together through a CPU bus connected to the NB logic 130. In some implementations, the NB logic 130 can be integrated into the CPU 110. The NB logic 130 can also be connected to a plurality of peripheral component interconnect express (PCIe) slots 160 and a south bridge (SB) logic 140. The plurality of PCIe slots 160 can be used for connections and buses such as PCI Express x1, USB 2.0, SMBus, SIM card, future extension for another PCIe lane, 1.5 V and 3.3 V power, and wires to diagnostics LEDs on the server's chassis.

In this example, the NB logic 130 and the SB logic 140 are connected by a peripheral component interconnect (PCI) Bus 135. The PCI Bus 135 can support function on the CPU 110 but in a standardized format that is independent of any of CPU's native buses. The PCI Bus 135 can be further connected to a plurality of PCI slots 170 (e.g., a PCI slot 171). Devices connect to the PCI Bus 135 may appear to a bus controller (not shown) to be connected directly to a CPU bus, assigned addresses in the CPU 110's address space, and synchronized to a single bus clock. PCI cards can be used in the plurality of PCI slots 170 include, but are not limited to, network interface cards (NICs), sound cards, modems, TV tuner cards, disk controllers, video cards, small computer system interface (SCSI) adapters, and personal computer memory card international association (PCMCIA) cards.

The SB logic 140 can couple the PCI bus 135 to a plurality of expansion cards or slots 150 (e.g., an ISA slot 152) via an expansion bus. The expansion bus can be a bus used for communications between the SB logic 140 and peripheral devices, and may include, but is not limited to, an industry standard architecture (ISA) bus, PC/104 bus, low pin count bus, extended ISA (EISA) bus, universal serial bus (USB), integrated drive electronics (IDE) bus, or any other suitable bus that can be used for data communications for peripheral devices.

In the example, the SB logic 140 is further coupled to a controller 151 that is connected to the at least one PSU 121. In some implementations, the controller 151 can be a baseboard management controller (BMC), rack management controller (RMC), or any other suitable type of system controller. The controller 151 is configured to control operations of the at least one PSU 121 and/or other applicable operations. In some implementations, the controller 151 is configured to monitor processing demands, and components and/or connection status of the server system 101.

In this example, the controller 151 is connected to the at least one expander (e.g., expanders 191 and 192) of the storage subsystem 102 via a cable or wireless connection (e.g., I2C, SMBus, or PCIe). In some embodiments, the controller 151 can monitor storage need of the server system 101 and determine whether storage capacity from the storage subsystem 102 is still needed. In response to determining that storage capacity from the storage subsystem 102 is no longer needed for the server system 101, the controller 151 can send a command to the at least one expander of the storage subsystem 102 to cause at least one component of the storage subsystem 102 to be switched into a power saving mode. In some embodiments, a command from the controller 151 can cause the at least one expander to determine one or more storage device arrays that are used by the server system 101 and switch the one or more storage device arrays into a power saving mode.

In some embodiments, in response to determining that storage capacity from the storage subsystem 102 is no longer needed for the server system 101, the controller 151 can inform a storage subsystem module 153 of the server system to send a command to the at least one expander of the storage subsystem 102. The storage subsystem module 153 can be an optional component in the server system 101. The command is configured to cause at least one component of the storage subsystem 102 to be switched into a power saving mode. In some embodiments, a storage subsystem module of the server system 101 can be configured to monitor the OS of the server system 101, determine the OS being powered off, and send a command to the at least one expander of the storage subsystem 102 to cause at least one component of the storage subsystem 102 to be switched into a power saving mode.

In some embodiments, a power saving mode includes at least one of operations such as power supplies to cooling components of the storage subsystem 102 is reduced or turned off, operation speed of at least one storage device disk of the storage subsystem 102 is reduced, all storage devices of the storage subsystem 102 are turned off, at least one expander is switched to an idle or standby mode, or the storage subsystem 102 is powered off. In some embodiments, a power saving mode can include a plurality of levels, each of which provide different levels of storage capacities and consume different levels of power. The storage subsystem 102 can be switched into different power saving modes depending on actual storage demands. In some embodiments, historical storage demands from the server system 101 can be accessed and analyzed to predict future storage demands from the server system 101. For example, if storage demands during a time period are predicted to be low, the storage subsystem 102 can be switched into a corresponding level of power saving mode to save power during the period. If storage demands during another time period are predicted to be high and the time period is less than a threshold time period away, the storage subsystem 102 can be switched into a corresponding power saving mode such that a suitable number of storage devices can be ready for use.

In some embodiments, one of the at least one expander of the storage subsystem 102 can monitor storage capacity need from the server system 101, determine at least one storage device of the storage subsystem 102 that is used by the server system 101, and determine whether or not to switch the at least one storage device to a power saving mode. In response to determining that the server system 101 no longer needs storage capacity from the storage subsystem 102, the expander can cause the at least one storage device of the storage subsystem 102 to be switched into a power saving mode.

In some embodiments, an external controller 155 that is located outside the server system 101 and the storage subsystem 102 can be used to monitor storage capacity need from the server system 101. The external controller 155 can determine at least one storage device of the storage subsystem 102 that is allocated to the server system 101. In response to determining that the server system 101 no longer needs storage capacity from the storage subsystem 102, the external controller 155 can cause the at least one storage device of the storage subsystem 102 to be switched into a power saving mode.

In some embodiments, the server system 101 can be shut down by a remote shutdown signal. Upon receiving the shutdown signal, the controller 151 can inform a storage subsystem module of the server system 101 to send a command to the expander of the storage subsystem 102. The command can cause at least one storage device of the storage subsystem 102 to be switched into a power saving mode. In some embodiments, upon receiving the shutdown signal, the controller 151 can directly send a command to the expander of the storage subsystem 102 to cause at least one storage device of the storage subsystem 102 to be switched into a power saving mode.

The server system 101 can also be shut down manually by pressing a power button 125. Upon detecting the power button being pressed, the controller 151 can inform a storage subsystem module of the server system 101 before powers off the server system 101. The storage subsystem module of the server system 101 can send a command to the expander of the storage subsystem 102, which can cause the storage subsystem 102 to be switched into a power saving mode. In some implementations, in response to detecting the power button 125 being pressed, the controller 151 directly sends a command to the expander of the storage subsystem 102 to cause the storage subsystem 102 to be switched into a power saving mode.

Figure 1B:
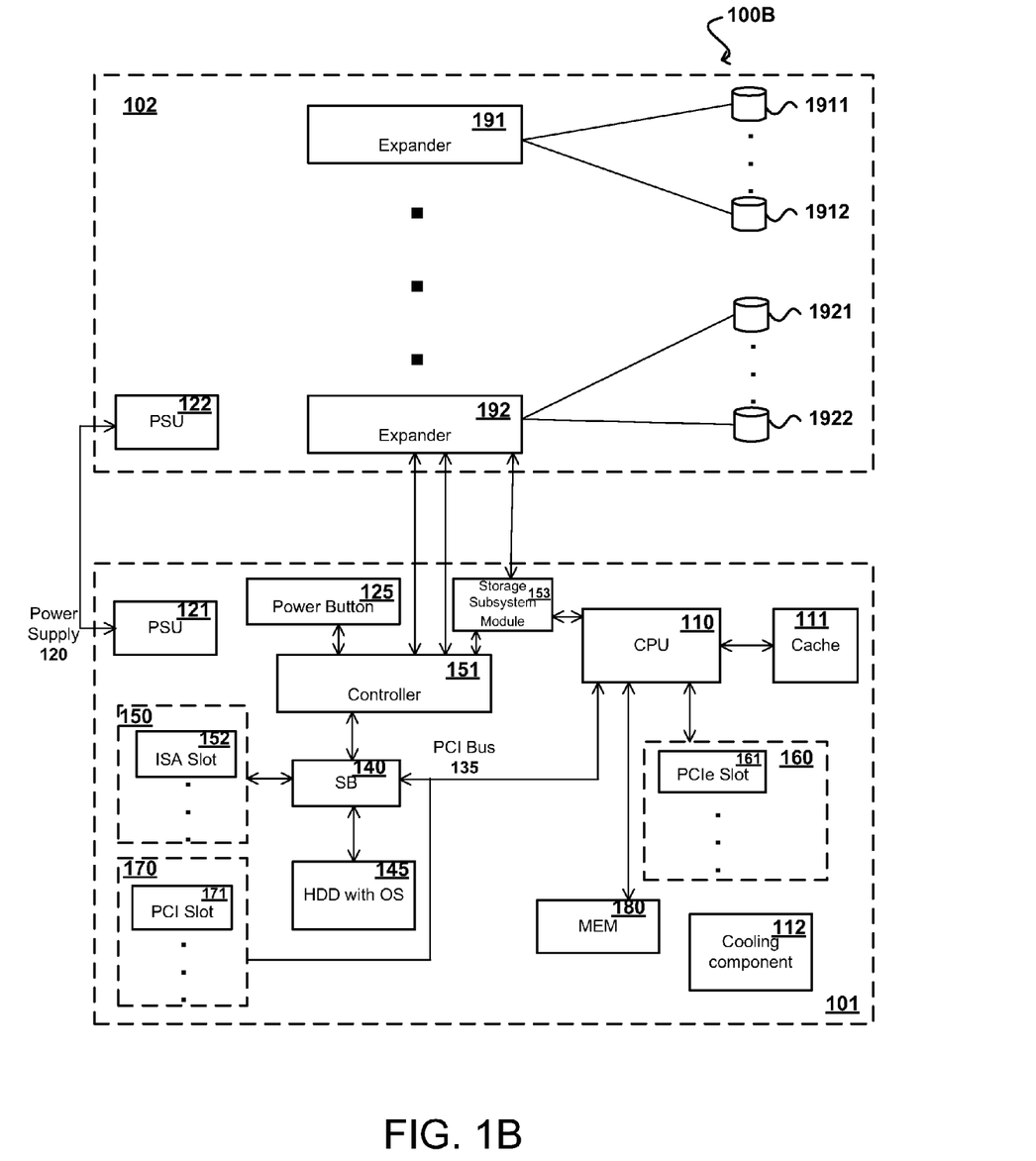

FIG. 1B illustrates another schematic block diagram of an exemplary system 100B containing the storage subsystem 102 and the server system 101 in accordance with another implementation of the present technology. In this example, the CPU 110 is connected to the SB 140, MEM 180, cache 111, storage subsystem module 153 and the PCIe slots 160. The controller 151 of the server system 101 is coupled to the expander 192 of the storage subsystem 102.

Although only certain components are shown within the exemplary systems 100A and 100B in FIGS. 1A and 1B, various types of electronic or computing components that are capable of processing or storing data, or receiving or transmitting signals can also be included in the exemplary systems 100A and 100B. Further, the electronic or computing components in the exemplary systems 100A and 100B can be configured to execute various types of application and/or can use various types of operating systems. These operating systems can include, but are not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

Depending on the desired implementation for the exemplary systems 100A and 100B, a variety of networking and messaging protocols can be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, the exemplary systems 100A and 100B illustrated in FIGS. 1A and 1B is used for purposes of explanation. Therefore, a network system can be implemented with many variations, as appropriate, yet still provide a configuration of network platform in accordance with various embodiments of the present technology.

In exemplary configurations of FIGS. 1A and 1B, the server system 101 and or storage subsystem 102 can also include one or more wireless components operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art. Various other elements and/or combinations are possible as well within the scope of various embodiments.

The above discussion is meant to be illustrative of the principles and various embodiments of the present technology. Numerous variations and modifications will become apparent once the above disclosure is fully appreciated.

Figure 2A:
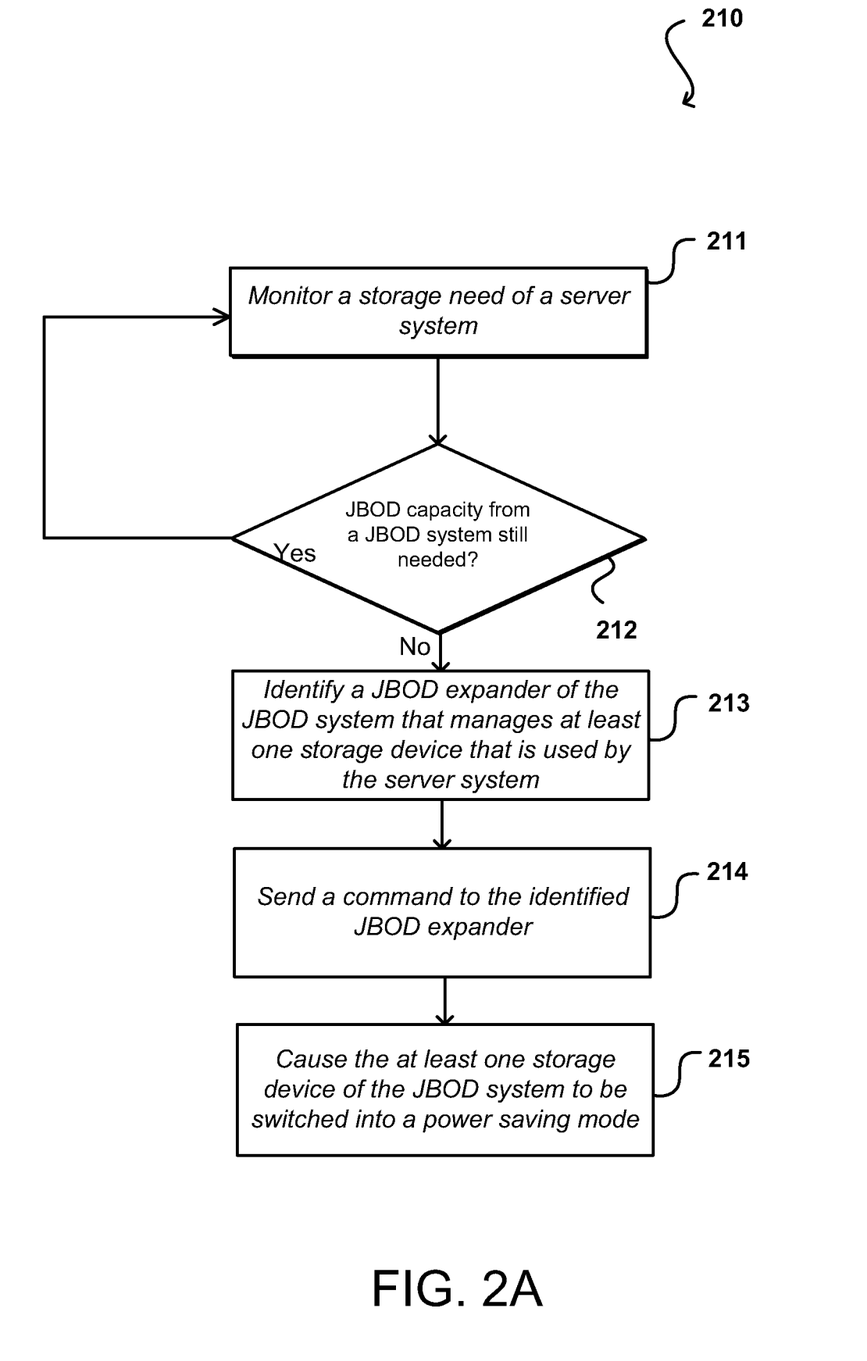
FIG. 2A illustrates an exemplary method of managing power consumption of a storage subsystem in accordance with an implementation of the present technology.

FIG. 2A illustrates an exemplary method 210 of managing power consumption of a storage subsystem in accordance with an implementation of the present technology. It should be understood that the exemplary method 210 is presented solely for illustrative purposes and that in other methods in accordance with the present technology can include additional, fewer, or alternative steps performed in similar or alternative orders, or in parallel. The exemplary method 210 starts with monitoring storage needs of a server system, at step 211. In some embodiments, the storage needs of the server system are monitored by a controller or a storage subsystem module of the server system, for example, the controller 151 or the storage subsystem module 153 as illustrated in FIGS. 1A and 1B.

At step 212, a determination can be made whether the server system still needs storage capacity from a storage subsystem. In response to determining that storage capacity from the storage subsystem is no longer needed for the server system, an expander of the storage subsystem that manages at least one storage device used by the server system can be identified, at step 213.

A command can be sent to the expander, at step 214. In some embodiments, a controller of the server system directly sends the command to the expander of the storage subsystem. In some embodiments, a controller of the server system can inform a storage subsystem module of the server system to send a command to the expander of the storage subsystem. The command is configured to cause the at least one storage device of the storage subsystem to be switched into a power saving mode.

At step 215, in response to receiving the command from the controller or the storage subsystem module of the server system, the at least one storage device of the storage subsystem can be switched into a power saving mode. In some embodiments, the command from the controller or the storage subsystem module of the server system can cause at least one storage device of the storage subsystem to switch between a normal operation mode, a power saving mode and a shutdown mode. In some implementations, the at least one storage device of the storage subsystem is managed by a corresponding expander of the storage subsystem, as illustrated in FIGS. 1A and 1B.

Figure 2B:
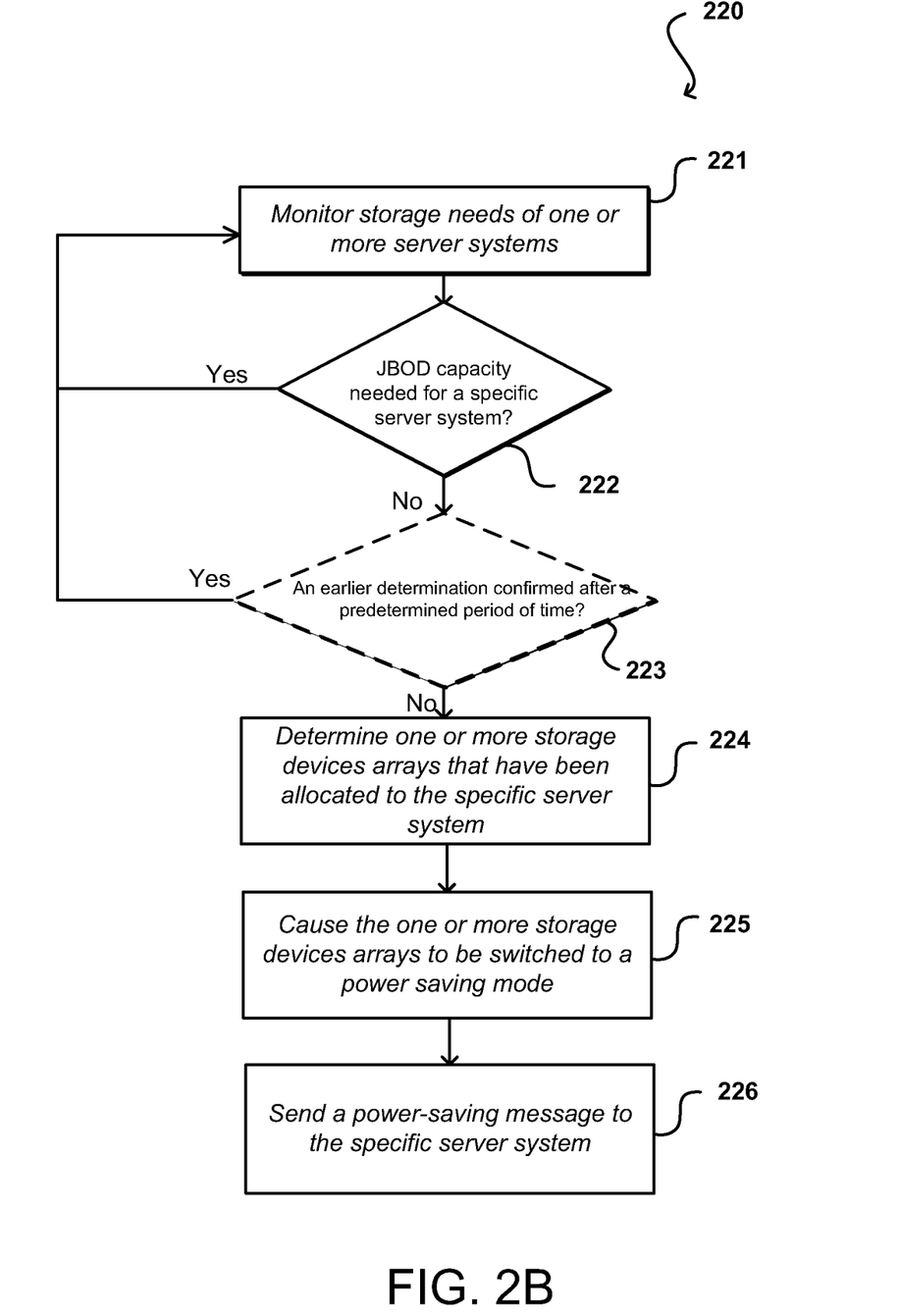
FIG. 2B illustrates another exemplary method of managing power consumption of a storage subsystem in accordance with an implementation of the present technology.

FIG. 2B illustrates another exemplary method 220 of managing power consumption of a storage subsystem in accordance with an implementation of the present technology. It should be understood that the exemplary method 220 is presented solely for illustrative purposes and that in other methods in accordance with the present technology can include additional, fewer, or alternative steps performed in similar or alternative orders, or in parallel. The exemplary method 220 starts with monitoring storage needs of one or more server systems, at step 221. In some embodiments, the storage needs of the one or more server systems are monitored by a controller or an expander of a storage subsystem, for example, the controller 151 or the storage subsystem module 153 as illustrated in FIGS. 1A and 1B.

At step 221, a determination can be made whether any of the one or more server systems no longer needs storage capacity from a storage subsystem. In some implementations, the determination can be made by an expander of the storage subsystem, as illustrated in FIGS. 1A and 1B. In response to determining that storage capacity from the storage subsystem is no longer needed for a specific server system, at least one storage device of the storage subsystem that has been allocated to the specific server system can be identified, at step 224. In some embodiments, one or more storage device arrays of the storage subsystem that have been allocated to the specific server system can be determined.

The at least one storage device of the storage subsystem can be switched into a power saving mode, at step 225. In some embodiments, in response to determining that storage capacity from the storage subsystem is no longer needed by the specific server system, a controller or an expander of the storage subsystem can switch one or more storage devices that have allocated to the specific server system into a power saving mode. In some embodiments, after a predetermined period of time, a second determination can be made whether the specific server system no longer needs storage capacity from the storage subsystem, at step 223 (optional). In response to the second determination being consistent with an earlier determination, the controller or the expander of the storage subsystem can cause the one or more storage devices that are used by the specific server system to be switched into the power saving mode.

At step 226, a power-saving message can be sent to the specific server system. The power-saving message can be used to notify the specific server system that the one or more storage devices of the storage subsystem are currently under a power saving mode and may not be readily available.

Terminologies

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks can be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments, networks, devices, ports, physical or logical links, and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources can include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources can be used to support virtual networks, virtual machines (VM), databases, applications (Apps), etc.

Cloud computing resources can include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

Figure 3:
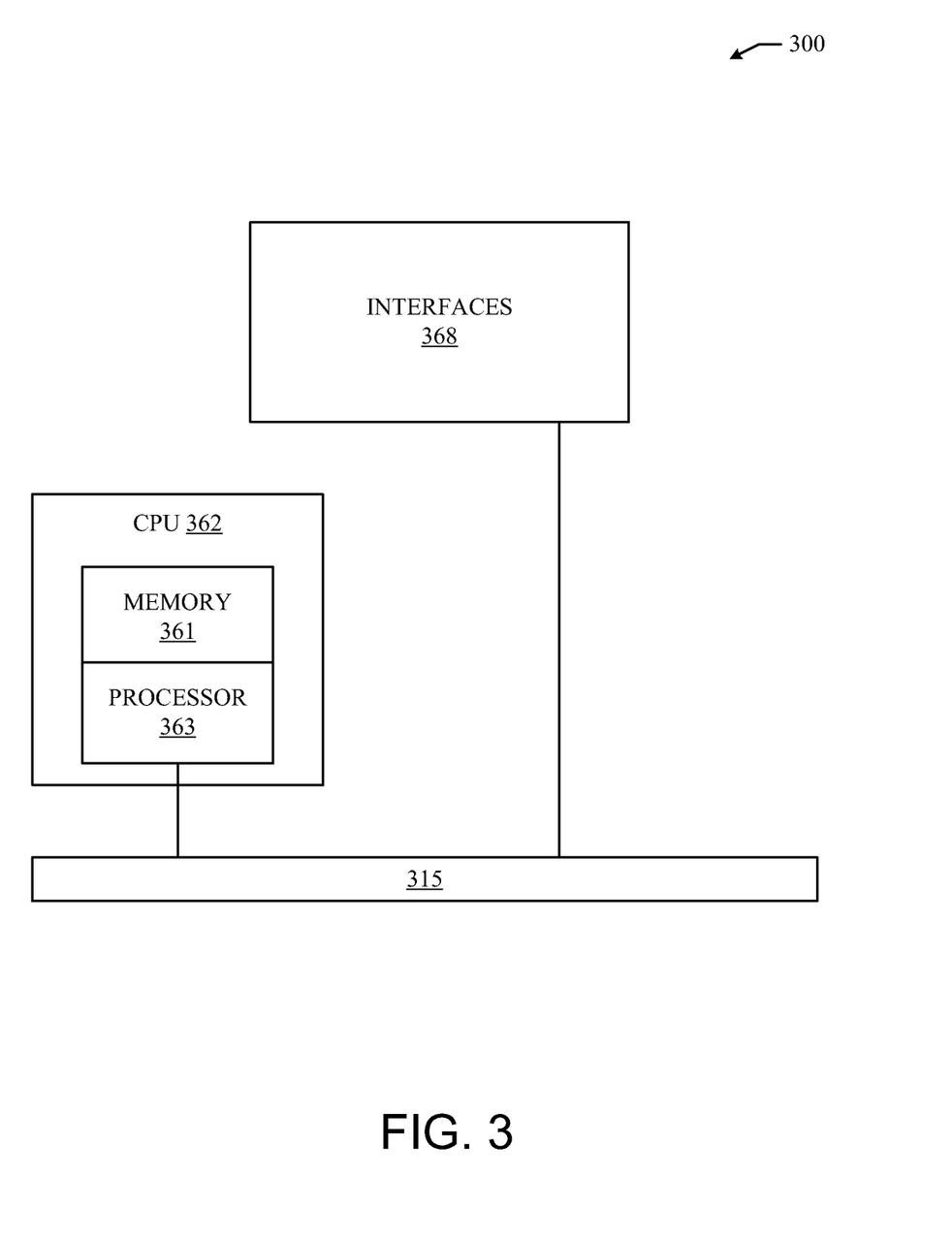
FIG. 3 illustrates an exemplary computing device in accordance with various implementations of the technology.

In a network switch system, a lookup database can be maintained to keep track of routes between a number of end points attached to the switch system. However, end points can have various configurations and are associated with numerous tenants. These end-points can have various types of identifiers, e.g., IPv4, IPv6, or Layer-2. The lookup database has to be configured in different modes to handle different types of end-point identifiers. Some capacity of the lookup database is carved out to deal with different address types of incoming packets. Further, the lookup database on the network switch system is typically limited by 1K virtual routing and forwarding (VRFs). Therefore, an improved lookup algorithm is desired to handle various types of end-point identifiers. The disclosed technology addresses the need in the art for address lookups in a telecommunications network. Disclosed are systems, methods, and computer-readable storage media for unifying various types of end-point identifiers by mapping end-point identifiers to a uniform space and allowing different forms of lookups to be uniformly handled. A brief introductory description of example systems and networks, as illustrated in FIGS. 3 and 4, is disclosed herein. These variations shall be described herein as the various examples are set forth. The technology now turns to FIG. 3.

FIG. 3 illustrates an example computing device 300 suitable for implementing the present technology. Computing device 300 includes a master central processing unit (CPU) 362, interfaces 368, and a bus 315 (e.g., a PCI bus). When acting under the control of appropriate software or firmware, the CPU 362 is responsible for executing packet management, error detection, and/or routing functions, such as miscabling detection functions, for example. The CPU 362 preferably accomplishes all these functions under the control of software including an operating system and any appropriate applications software. CPU 362 can include one or more processors 363 such as a processor from the Motorola family of microprocessors or the MIPS family of microprocessors. In an alternative embodiment, processor 363 is specially designed hardware for controlling the operations of the computing device 300. In a specific embodiment, a memory 361 (such as non-volatile RAM and/or ROM) also forms part of CPU 362. However, there are many different ways in which memory could be coupled to the system.

The interfaces 368 are typically provided as interface cards (sometimes referred to as "line cards"). Generally, they control the sending and receiving of data packets over the network and sometimes support other peripherals used with the computing device 300. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces can include ports appropriate for communication with the appropriate media. In some cases, they can also include an independent processor and, in some instances, volatile RAM. The independent processors can control such communications intensive tasks as packet switching, media control and management. By providing separate processors for the communications intensive tasks, these interfaces allow the master microprocessor 362 to efficiently perform routing computations, network diagnostics, security functions, etc.

Although the system shown in FIG. 3 is one specific computing device of the present technology, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it can employ one or more memories or memory modules (including memory 361) configured to store program instructions for the general-purpose network operations and mechanisms for roaming, route optimization and routing functions described herein. The program instructions can control the operation of an operating system and/or one or more applications, for example. The memory or memories can also be configured to store tables such as mobility binding, registration, and association tables, etc.

Figure 4A:
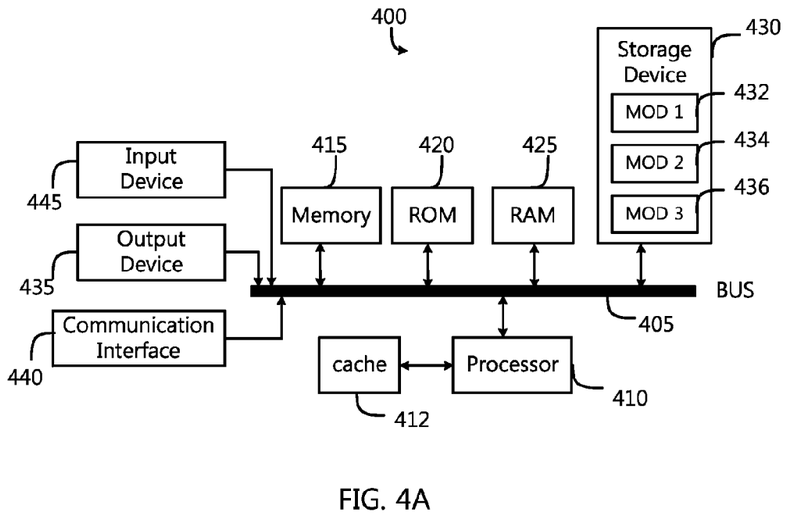
FIGS. 4A and 4B illustrate exemplary systems in accordance with various embodiments of the present technology.
Figure 4B:
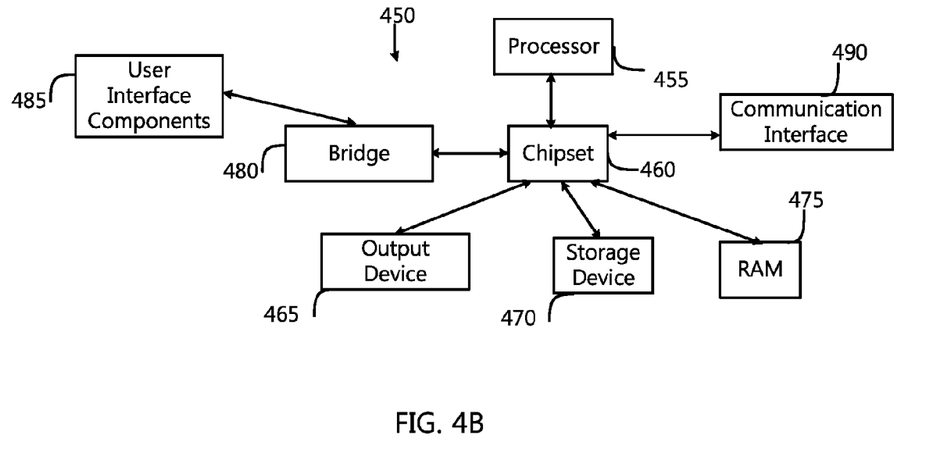

FIG. 4A, and FIG. 4B illustrate example possible systems in accordance with various aspects of the present technology. The more appropriate embodiment will be apparent to those of ordinary skill in the art when practicing the present technology. Persons of ordinary skill in the art will also readily appreciate that other system examples are possible.

FIG. 4A illustrates a conventional system bus computing system architecture 400 wherein the components of the system are in electrical communication with each other using a bus 405. Example system 400 includes a processing unit (CPU or processor) 410 and a system bus 405 that couples various system components including the system memory 415, such as read only memory (ROM) 420 and random access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 can be available for use as well. The memory 415 can include multiple different types of memory with different performance characteristics. The processor 410 can include any general purpose processor and a hardware module or software module, such as module 432, module 434, and module 436 stored in storage device 430, configured to control the processor 410 as well as a special-purpose processor where software instructions are incorporated into the actual processor design. The processor 410 can essentially be a completely self-contained computing system, containing multiple cores or processors, a bus, memory controller, cache, etc. A multi-core processor can be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing device 400. The communications interface 440 can generally govern and manage the user input and system output. There is no restriction on operating on any particular hardware arrangement and therefore the basic features here can easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include software modules 432, 434, 436 for controlling the processor 410. Other hardware or software modules are contemplated. The storage device 430 can be connected to the system bus 405. In one aspect, a hardware module that performs a particular function can include the software component stored in a computer-readable medium in connection with the necessary hardware components, such as the processor 410, bus 405, output device 435 (e.g., a display), and so forth, to carry out the function.

FIG. 4B illustrates a computer system 450 having a chipset architecture that can be used in executing the described method and generating and displaying a graphical user interface (GUI). Computer system 450 is an example of computer hardware, software, and firmware that can be used to implement the disclosed technology. System 450 can include a processor 455, representative of any number of physically and/or logically distinct resources capable of executing software, firmware, and hardware configured to perform identified computations. Processor 455 can communicate with a chipset 460 that can control input to and output from processor 455. In this example, chipset 460 outputs information to output 465, such as a display, and can read and write information to storage device 470, which can include magnetic media, and solid state media, for example. Chipset 460 can also read data from and write data to RAM 475. A bridge 480 for interfacing with a variety of user interface components 485 can be provided for interfacing with chipset 460. Such user interface components 485 can include a keyboard, a microphone, touch detection and processing circuitry, a pointing device, such as a mouse, and so on. In general, inputs to system 450 can come from any of a variety of sources, machine generated and/or human generated.

Chipset 460 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 455 analyzing data stored in storage 470 or RAM 475. Further, the machine can receive inputs from a user via user interface components 485 and execute appropriate functions, such as browsing functions by interpreting these inputs using processor 455.

It can be appreciated that example systems 400 and 450 can have more than one processor 410 or be part of a group or cluster of computing devices networked together to provide greater processing capability.

For clarity of explanation, in some instances the present technology can be presented as including individual functional blocks including functional blocks comprising devices, device components, steps or routines in a method embodied in software, or combinations of hardware and software.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Various aspects of the present technology provide systems and methods for managing power consumption of a storage subsystem. While specific examples have been cited above showing how the optional operation can be employed in different instructions, other examples can incorporate the optional operation into different instructions. For clarity of explanation, in some instances the present technology can be presented as including individual functional blocks including functional blocks comprising devices, device components, steps or routines in a method embodied in software, or combinations of hardware and software.

The various examples can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

To the extent examples, or portions thereof, are implemented in hardware, the present invention can be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Most examples utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network and any combination thereof.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these technology can comprise hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

In examples utilizing a Web server, the Web server can run any of a variety of server or mid-tier applications, including HTTP servers, FTP servers, CGI servers, data servers, Java servers and business application servers. The server(s) can also be capable of executing programs or scripts in response requests from user devices, such as by executing one or more Web applications that can be implemented as one or more scripts or programs written in any programming language, such as Java®, C, C# or C++ or any scripting language, such as Perl, Python or TCL, as well as combinations thereof. The server(s) can also include database servers, including without limitation those commercially available from open market.

The server farm can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system can also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate examples can have numerous variations from that described above. For example, customized hardware might also be used and/or particular elements might be implemented in hardware, software (including portable software, such as applets) or both. Further, connection to other computing devices such as network input/output devices can be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EPROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the technology and teachings provided herein, a person of ordinary skill in the art will appreciate other ways and/or methods to implement the various aspects of the present technology.

The specification and drawings are, accordingly, to be regarded in an illustrative rather than a restrictive sense. It will, however, be evident that various modifications and changes can be made thereunto without departing from the broader spirit and scope of the invention as set forth in the claims.

What is claimed is:

1. A computer-implemented method for managing power consumption of a storage subsystem, comprising:
    monitoring, by a baseboard management controller (BMC) of a specific server system, storage need of the specific server system;
    determining, by the BMC, that storage capacity from the storage subsystem is no longer required for the specific server system;
    determining an expander of the storage subsystem, the expander managing at least one storage device of the storage subsystem that is used by the specific server system, the expander configured to switch the at least one storage device between a normal operation mode and a power saving mode, wherein the power saving mode includes switching the expander to an idle or standby mode; and
    sending, by the BMC, a first command to the expander to reduce the operation speed of at least one storage device disk of the at least one storage device, and a second command to reduce the power of at least one cooling component of the storage subsystem.

2. The computer-implemented method of claim 1, wherein the storage subsystem comprises one or more storage device arrays, further comprising:
    determining at least one of the storage device arrays that is used by the specific server system; and
    causing the at least one of the storage device arrays to be switched into the power saving mode.

3. The computer-implemented method of claim 1, wherein the determining that storage capacity from the storage subsystem is no longer required for the specific server system includes:
 confirming that storage capacity from the storage subsystem is no longer required for the specific server system after a predetermined period of time.

4. The computer-implemented method of claim 1, wherein the power saving mode further includes at least one of turning off all storage devices of the storage subsystem, or powering off the storage subsystem.

5. The computer-implemented method of claim 1, further comprising:
 in response to receiving a remote shutdown signal for the specific server system, sending a second command to the expander of the storage subsystem, the second command causing the at least one storage device of the storage subsystem to be switched into the power saving mode.

6. The computer-implemented method of claim 1, further comprising:
 in response to receiving a remote shutdown signal for the specific server system, sending a signal to a storage subsystem module of the specific server system to cause the storage subsystem module to send a second command to the expander of the storage subsystem, the second command causing the at least one storage device of the storage subsystem to be switched into the power saving mode.

7. The computer-implemented method of claim 6, wherein the storage need of the specific server system is monitored by an internal or external controller of the specific server system.

8. The computer-implemented method of claim 1, further comprising:
 in response to detecting a local shutdown signal, sending a signal to a storage subsystem module of the specific server system to cause the storage subsystem module to send a second command to the expander of the storage subsystem, the second command causing the at least one storage device of the storage subsystem to be switched into the power saving mode.

9. The computer-implemented method of claim 1, further comprising:
 in response to detecting a local shutdown signal, sending a second command to the expander of the storage subsystem, the second command causing the at least one storage device of the storage subsystem to be switched into the power saving mode.

10. A computer-implemented method for managing power consumption of a storage subsystem, comprising:
 monitoring, by a baseboard management controller (BMC) of a specific server system, storage need of one or more server systems;
 determining, by the BMC, that storage capacity from the storage subsystem is no longer required for a specific server system;
 determining at least one storage device of the storage subsystem that is used by the specific server system;
 determining an expander of the storage subsystem, the expander managing the at least one storage device of the storage subsystem that is used by the one or more server systems, the expander configured to switch the at least one storage device between a normal operation mode and a power saving mode, wherein the power saving mode includes switching the expander to an idle or standby mode; and
 sending, by the BMC, a first command to the expander to reduce the operation speed of at least one storage device disk of the at least one storage device, and a second command to reduce the power of the at least one cooling component of the storage subsystem.

11. The computer-implemented method of claim 10, wherein the storage need of the one or more server systems is monitored by an internal or external controller of the storage subsystem.

12. The computer-implemented method of claim 10, wherein the determining that storage capacity from the storage subsystem is no longer required for the specific server system includes:
 confirming that storage capacity from the storage subsystem is no longer required for the specific server system after a predetermined period of time.

13. The computer-implemented method of claim 10, wherein the power saving mode further includes at least one of turning off all storage devices of the storage subsystem, switching the expander to an idle or standby mode, or powering off the storage subsystem.

14. The computer-implemented method of claim 10, further comprising:
 in response to receiving a remote shutdown signal, sending a second command to the expander of the storage subsystem, the second command causing the at least one storage device of the storage subsystem to be switched into the power saving mode.

15. A computing system, comprising:
 a baseboard management controller (BMC) configured to:
 monitor storage need of the computing system;
 determine that storage capacity from a storage subsystem is no longer required for the computing system;
 determine at least one storage device of the storage subsystem that is used by the computing system;
 determine an expander of the storage subsystem, the expander managing the at least one storage device of the storage subsystem that is used by the computing system, the expander configured to switch the at least one storage device between a normal operation mode and a power saving mode, wherein the power saving mode includes switching the expander to an idle or standby mode; and
 send a first command to the expander to reduce the operation speed of at least one storage device disk of the at least one storage device, and a second command to reduce the power of at least one cooling component of the storage subsystem.

16. The system of claim 15, wherein the BMC is further configured to:
 in response to receiving a remote shutdown signal, send a signal to a storage subsystem module of the computing system to cause the storage subsystem module to send a second command to the expander of the storage subsystem, the second command causing the at least one storage device of the storage subsystem to be switched into the power saving mode.

17. The system of claim 16, wherein the storage subsystem module is a driver or an application program running on an operating system of the computing system.

18. The system of claim 15, wherein the BMC is further configured to:
 in response to detecting a local shutdown signal, send a signal to a storage subsystem module of the specific server system to cause the storage subsystem module to send a second command to the expander of the storage subsystem, the second command causing the at least one storage device of the storage subsystem to be switched into the power saving mode.

* * * * *